(12) United States Patent
Barker et al.

(10) Patent No.: US 12,080,850 B2
(45) Date of Patent: Sep. 3, 2024

(54) NON-AQUEOUS ELECTROLYTE COMPOSITIONS

(71) Applicant: FARADION LIMITED, South Yorkshire (GB)

(72) Inventors: Jeremy Barker, Oxfordshire (GB); Ruth Sayers, South Yorkshire (GB)

(73) Assignee: Faradion Limited, South Yorkshire (GB)

( * ) Notice: Subject to any disclaimer, the term of this patent is extended or adjusted under 35 U.S.C. 154(b) by 349 days.

(21) Appl. No.: 16/771,769

(22) PCT Filed: Dec. 13, 2018

(86) PCT No.: PCT/GB2018/053625
§ 371 (c)(1),
(2) Date: Jun. 11, 2020

(87) PCT Pub. No.: WO2019/116044
PCT Pub. Date: Jun. 20, 2019

(65) Prior Publication Data
US 2021/0175544 A1 Jun. 10, 2021

(30) Foreign Application Priority Data

Dec. 13, 2017 (GB) ..................... 1720745

(51) Int. Cl.
| | |
|---|---|
| H01M 10/0569 | (2010.01) |
| H01M 4/583 | (2010.01) |
| H01M 4/587 | (2010.01) |
| H01M 10/054 | (2010.01) |
| H01M 10/0567 | (2010.01) |
| H01M 10/0568 | (2010.01) |
| H01M 4/02 | (2006.01) |

(52) U.S. Cl.
CPC ....... *H01M 10/0569* (2013.01); *H01M 4/583* (2013.01); *H01M 4/587* (2013.01); *H01M 10/054* (2013.01); *H01M 10/0567* (2013.01); *H01M 10/0568* (2013.01); *H01M 2004/027* (2013.01); *H01M 2300/004* (2013.01); *H01M 2300/0042* (2013.01)

(58) Field of Classification Search
None
See application file for complete search history.

(56) References Cited

U.S. PATENT DOCUMENTS

| | | |
|---|---|---|
| 5,130,211 A | 7/1992 | Wilkinson et al. |
| 2003/0162099 A1 | 8/2003 | Bowden et al. |
| 2005/0202320 A1 | 9/2005 | Totir et al. |
| 2007/0298326 A1 | 12/2007 | Angell et al. |

FOREIGN PATENT DOCUMENTS

| | | |
|---|---|---|
| EP | 2755273 | 7/2014 |
| EP | 2937918 | 10/2015 |
| KR | 20170129546 | 11/2017 |
| WO | 2016043619 | 3/2016 |
| WO | 2018080399 | 5/2018 |

OTHER PUBLICATIONS

International Search Report and Written Opinion dated Jan. 31, 2019, from International Application No. PCT/GB2018/053625, 13 pages.
Combined Search and Examination Report under Sections 17 and 18(3) dated Jun. 7, 2018, issued in connection with correspondence GB Application No. 1720745.7, 8 pages.
Wu, F., et al. "Highly Safe Ionic Liquid Electrolytes for Sodium-Ion Battery: Wide Electrochemical Window and Good Thermal Stability", ACS Appl. Mater. Interfaces 2016, 8, 21381-21386.
Jo, I., et al. "The effect of electrolyte on the electrochemical properties of Na/a-NaMnO2 batteries", Materials Research Bulletin 58 (2014) 74-77.
Rudola, A., et al. "Monoclinic Sodium Iron Hexacyanoferrate Cathode and Non-Flammable Glyme-Based Electrolyte for Inexpensive Sodium-Ion Batteries", Journal of The Electrochemical Society, 164 (6) A1098-A1109 (2017).
Egashira M. et al. "Ionic conductivity of ternary electrolytes containing sodium salt and ionic liquid"; Electrochimica Acta, vol. 58, Dec. 30, 2011, pp. 95-98.
Office Action mailed Jan. 19, 2023 in connection with corresponding Chinese Patent Application 201880077390.9 (with translation) (16 pages).

*Primary Examiner* — Laura Weiner
(74) *Attorney, Agent, or Firm* — Meunier Carlin & Curfman LLC

(57) ABSTRACT

The invention relates to novel non-aqueous electrolyte compositions comprising: a) a sodium-containing compounds of the general formula NaMF$_X$ and b) a solvent system comprising a first solvent component i) which comprises propylene carbonate and one or more further organo carbonate-containing solvents, and a second solvent component ii) which comprises one or more glycol diethers and/or one or more glycol ether acetates; wherein the molar ratio of propylene carbonate:one or more glycol diethers and/or one or more glycol ether acetates is in the range 1:0.1 to 1:3.

10 Claims, 8 Drawing Sheets

NON-AQUEOUS ELECTROLYTE COMPOSITIONS

FIELD OF THE INVENTION

The present invention relates to novel non-aqueous electrolyte compositions, a sodium-ion cell comprising said novel non-aqueous electrolyte compositions and energy storage devices such as batteries, rechargeable batteries, electrochemical devices and electrochromic devices which include said non-aqueous electrolyte compositions.

BACKGROUND OF THE INVENTION

Sodium-ion batteries are analogous in many ways to the lithium-ion batteries that are in common use today; they are both reusable secondary batteries that comprise an anode (negative electrode), a cathode (positive electrode) and an electrolyte material, both are capable of storing energy, and they both charge and discharge via a similar reaction mechanism. When a sodium-ion (or lithium-ion) battery is charging, $Na^+$ (or $Li^+$) ions de-intercalate from the cathode and insert into the anode. Meanwhile charge balancing electrons pass from the cathode through the external circuit containing the charger and into the anode of the battery. During discharge the same process occurs but in the opposite direction.

Lithium-ion battery technology has enjoyed a lot of attention in recent years and provides the preferred portable battery for most electronic devices in use today; however lithium is not a cheap metal to source and is considered too expensive for use in large scale applications. By contrast sodium-ion battery technology is still in its relative infancy but is seen as advantageous; sodium is much more abundant than lithium and some researchers predict this will provide a cheaper and more durable way to store energy into the future, particularly for large scale applications such as storing energy on the electrical grid. Nevertheless a lot of work has yet to be done before sodium-ion batteries are a commercial reality.

One area that needs more attention is the development of suitable electrolyte compositions, particularly for sodium-ion batteries.

Although the design of suitable electrolyte compositions is given less attention than active materials (electrodes), their importance should not be overlooked as they are in large part the key to battery life and for determining the practical performance achievable by a cell, for example in terms of capacity, rate capability, safety etc. However, to be a suitable electrolyte composition, it must fulfil a long list of attributes, these include:

Chemical stability—there must be no reactions during the cell operation, including within the electrolyte itself or with the separator, the electrodes, current collectors or the packaging materials used;

Electrochemical stability—there must be a large separation of high and low onset potentials for decomposition by oxidation or reduction, respectively;

Thermal stability—the electrolyte composition needs to be liquid therefore its melting and boiling points must be well outside the internal operating temperatures of the cell. The electrolyte solvent system is especially important for this property;

Ionic conductivity and electronic insulation, these are necessary to maintain cell operation by $Na^+$ transport and to minimize self-discharge of the cell, respectively;

Low toxicity;

Based on sustainable chemistries, i.e. made using abundant elements and via low impact syntheses (energy, pollution etc.) and Cost effective production.

In lithium-ion cells, the most common electrolyte compositions contain either $LiPF_6$ or $LiBF_4$ dissolved in organic carbonate-based solvents; electrolyte compositions comprising 1M $LiPF_6$ in either a mixture of EC (ethylene carbonate)/DMC (dimethyl carbonate) or a mixture of EC (ethylene carbonate)/EMC (ethyl methyl carbonate are regarded by most workers as the "standard" Li-ion cell electrolytes. In the case of sodium-ion cells, the sodium analogue, $NaPF_6$, may be used in place of the $LiPF_6$, but a much more cost effective alternative is $NaBF_4$. The latter also has the benefit of improved thermal stability compared with $NaPF_6$. Unfortunately however, $NaBF_4$ has very low solubility in organic carbonate-based electrolyte solvents, and this results in the ionic conductivity of the resulting electrolyte compositions being generally too low for practical application. Thus, poor solubility of $NaBF_4$-containing electrolyte compositions in traditional organic carbonate-based solvents produce inferior electrochemical performance when compared against an equivalent cell using $NaPF_6$.

To overcome the organic carbonate-based solubility problem, attempts have been made to develop solvents for electrolyte compositions in which $NaBF_4$ is more readily dissolved. For example, M. Egashira et al describes, in Electrochimica Acta, Vol. 58, 30 Dec. 2011, pp 95-98: "Ionic conductivity of ternary electrolytes containing sodium salt and ionic liquid", that non-aqueous electrolytes comprising $NaBF_4$ may usefully contain a mixture of solvents i) a high level of tetraglyme material i.e. poly(ethylene glycol) dimethyl ether (PEGDME), and ii) an ionic liquid diethyl methoxyethyl ammonium tetrafluoroborate ($DEMEBF_4$). The molar ratio of PEGDME:$NaBF_4$:$DEMEBF_4$ is disclosed to be 8:1:2.

However, this disclosure may not provide the best answer to the solubility problem. It is true that a number of ionic liquids match many of the requirements to give suitable electrolyte solvents; they are liquid over a wide range, they exhibit thermal and electrical stability and they have no or very low vapour pressure which makes them non-flammable and therefore highly safe, for example as discussed by F. Wu et al in "Highly Safe Ionic Liquid Electrolytes for Sodium-Ion Battery: Wide Electrochemical Window and Good Thermal Stability", ACS Appl. Mater. Interfaces 2016, 8, 21381-21386. But despite these advantageous, ionic liquids also have some significant drawbacks: firstly, most ionic liquids have a rather high viscosity, typically in the order of tens of cP at room temperature, and furthermore their viscosity often increases upon doping with the charge carrier, i.e. the Na-salt. Secondly, ionic liquids tend to be very expensive making their use impractical for commercial applications. Thirdly, inconclusive literature reporting has led many to consider that ionic liquids show poor cell performance (specific capacity). Indeed in Egashira et al's study referenced above, there is no verification of the performance in a sodium-ion cell and all of the characterisation has been ex-situ of a cell.

Further work by Ki-Won Kim et al, reported in Materials Research Bulletin 58 (2014) 74-77, "The effect of electrolyte on the electrochemical properties of Na/a-NaMnO2 batteries" and by A. Rudola et al, reported in Journal of The Electrochemical Society, 164 (6) A1098-A1109 (2017), "Monoclinic Sodium Iron Hexacyanoferrate Cathode and Non-Flammable Glyme-Based Electrolyte for Inexpensive Sodium-Ion Batteries" presents electrochemical results obtained when using an electrolyte comprising 1M $NABF_4$ in poly(ethylene glycol) dimethyl ether (PEGDME, tetraglyme), testing against a graphite anode. However as Rudola et al. demonstrate, a pure tetraglyme electrolyte in a Na-ion cell with a graphite anode exhibits a cell capacity that is significantly lower than that of a carbonate-based electrolyte; a cell with 1 M NaBF4 in tetraglyme shows a capacity of 35 mAh/[g(anode)+g(cathode)] and a low (circa 90%) Coulombic efficiency, compared with a measured capacity for the positive active material of 170.9 mAh/g using a carbonate based electrolyte (1 M NaClO4 in EC:PC). The reason why the carbonate electrolyte gives a higher capacity performance is in part due to the stability of the carbonate electrolyte over a wider voltage range, whilst pure tetraglyme based electrolytes are limited in this respect. However, pure carbonate electrolyte cannot be used in a full Na-ion cell with graphite as the propylene carbonate solvent will intercalate into the graphite, causing mechanical damage to the material and hindering the electrochemical performance.

The aim of the present invention therefore is to provide improved sodium ion conducting electrolyte compositions (that is, they are electrolyte compositions which are designed for use in sodium-ion secondary cells) which use sodium-containing salts of the general formula $NaMF_X$ in which x=4 or 6, for example sodium tetrafluoroborate ($NaBF_4$) and sodium hexafluorophosphate ($NaPF_6$), dissolved in a suitable solvent system. The electrolyte compositions of the present invention will be cost effective and will not suffer the abovementioned drawbacks of the standard organic carbonate solvent systems and solvent systems which include large amounts of ionic liquids. Further, the present invention aims to provide electrolyte compositions which demonstrate excellent electrochemical performance in sodium-ion cells, and especially sodium-ion cells which employ a non-graphitic carbon anode electrode, such as a hard carbon anode electrode.

The present invention achieves these aims by providing a novel solvent system which comprises a carefully selected combination of solvents.

Thus, the present invention provides a non-aqueous electrolyte composition comprising:
a) one or more sodium-containing salts of the general formula $NaMF_X$, where M is one or more metals and/or non-metals, and x=4 or 6; and
b) a solvent system which comprises:
  i) a first solvent component which comprises propylene carbonate (an organo carbonate-based solvent) together with one or more further organo carbonate-based solvents; and
  ii) a second solvent component which comprises one or more glycol diethers and/or one or more glycol ether acetates;
wherein the molar ratio of propylene carbonate:one or more glycol diethers and/or one or more glycol ether acetates is in the range 1:0.1 to 1:3.

As is demonstrated in the specific examples presented below, the above solvent system of the present invention provides surprising and significant advantages (particularly regarding a reduced drop in first cycle loss) over other solvent systems which do not specifically include propylene carbonate in addition to one or more further organo carbonate-based solvents and one or more glycol diethers and/or glycol ether acetates.

The one or more metals and/or non-metals, M, are preferably selected from aluminium ($Al^{3+}$), boron ($B^{3+}$), gallium ($Ga^{3+}$), indium ($In^{3+}$), scandium ($Sc^{3+}$), Yttrium ($Y^{3+}$), lanthanum ($La^{3+}$) and phosphorus ($P^{5+}$). Particularly preferably, M is selected from $Al^{3+}$), boron ($B^{3+}$), gallium ($Ga^{3+}$), phosphorus ($P^{5+}$) and arsenic ($As^{5+}$). The most preferred sodium-containing salts of the general formula $NaMF_X$ are sodium tetrafluoroborate ($NaBF_4$) and sodium hexafluorophosphate ($NaPF_6$).

In a preferred non-aqueous electrolyte composition of the present invention, a) may also contain one or more further sodium salts in addition to the one or more sodium-containing salts of the general formula $NaMF_X$ described above.

The one or more further sodium salts may be any suitable sodium salt. They are preferably are selected from:
compounds of the formula $NaXO_4$, where X is one or more halogens, for example fluorine, chlorine, bromine and iodine. Preferred further sodium salts include $NaClO_4$;
sodium trifluoromethanesulfonate, also known as sodium triflate or NaOTf ($CF_6NaSO_3$);
Sodium Bis(fluorosulfonyl)imide also known as NaFSI (Na $N(SO_2F)_2$); and
Sodium Bis(trifluoromethanesulfonyl)imide also known as NaTFSI ($C_2F_6NNaO_4S_2$)

The electrolyte composition of the present invention may further comprise a third solvent component iii) which comprises one or more sulfone group-containing solvents, for example of the general formula R—$SO_2$—R'. In these sulfone group-containing solvents, R and R' may be independently selected (i.e. they may be the same or different from each other) from any straight or branched, substituted or unsubstituted $C_1$ to $C_6$-alkyl group (for example tetramethyl sulfone-ethyl acetate (TMS-EA)), or any substituted or unsubstituted $C_1$ to $C_6$-membered alkyl or alkenyl ring such as a cyclic sulfone. A preferred cyclic sulfone is $(CH_2)_4SO_2$ which is known as sulfolane.

Thus, the present invention provides a non-aqueous electrolyte composition comprising:
a) one or more sodium-containing salts of the general formula: $NaMF_X$, where M is one or more metals and/or non-metals as defined above, and x=4 or 6; and optionally one or more further sodium salts as defined above; and
b) a solvent system which comprises:
  i) a first solvent component which comprises propylene carbonate together with one or more further organo carbonate-based solvents;
  ii) a second solvent component which comprises one or more glycol diethers and/or one or more glycol ether acetates; and
  iii) a third solvent component which comprises one or more sulfone-group containing solvents.

It is convenient to express the amount of the propylene carbonate relative to the amount of the one or more glycol diethers and/or one or more glycol ether acetates (referred to herein collectively as "glyme", as a molar ratio. Preferably the propylene carbonate (PC): glyme mole ratio is in the range 1:0.1 to 1:3, further preferably the mole ratio of PC:glyme is in the range 1:0.1 to 1:2, and particularly preferably 1:0.2 to 1:<2. A PC:glyme mole ratio in the range 1:0.5 to 1:1.5 is especially preferred.

It is also convenient to define the molar ratio for the amount of glyme present in the solvent system relative to the total amount of organo carbonate containing-compounds present, that is, the propylene carbonate together with the one or more further organo carbonate-based solvents, such that a preferred molar ratio for the total amount of organo carbonate-based solvents:glyme, is in the range 2:1 to 10:1, and a further preferred molar ratio is in the range 4:1 to 8:1.

The molar ratio of the one or more further organo carbonate-based solvents to the amount of propylene carbonate is preferably in the range 6:1 to 1:1 and especially preferably 3:1.

The present invention is distinguished over the electrolyte compositions described in the literature papers by Egashira et al, Ki-Won Kim et al and A. Rudola et al, by the fact that neither of these prior art documents teaches electrolyte compositions which contain propylene carbonate in combination with one or more further organo-carbonate based solvents. Specifically, Rudola et al. discloses an electrolyte composition comprising 1M $NaBF_4$ in pure tetraglyme and Egashira et al. describes an electrolyte composition which comprises $NaBF_4$ in a mixture of poly(ethylene glycol) dimethyl ether (PEGDME, polyglyme) and an ionic-liquid; the molar ratio polyglyme:ionic liquid being 8:0 to 8:8.

When the solvent system b) comprises a third solvent component iii), the molar ratio of (i+ii): iii (that is the number of moles of i) plus the number of moles of ii) expressed as a ratio with the number of moles of iii)) will be in the range 1:0.25 to 1:5, preferably in the range 1:0.25 to 1:3, further preferably in the range 1:0.5 to 1:3, ideally in the range 1:0.5 to 1:1, and most preferably in the range 1:0.5 to 1:2. The amount (i+ii) is determined from the ratios of the number of moles of i) and ii) as described above. For the avoidance of doubt, the third solvent component iii) will not increase the amount of glycol diether and/or glycol ether acetate materials which is present in the solvent system.

A convenient way to express the amount of the one or more sodium-containing compounds of the general formula $NaMF_X$ which is present in the electrolyte compositions of the present invention discussed above, is in terms of the molarity of the components in a), in the solvent system b). That is, the number of moles of the sodium-containing compounds of the general formula $NaMF_X$ (calculated in conjunction with the amount of the optional one or more further sodium salts, where used) in a), per litre of the solvent system b). Preferably, the molarity of the components in a) is in the range 0.1M to 5M, and further preferably in the range 0.1M to 2M. Highly preferably, when the component in a) is $NaBF_4$ or $NaPF_6$, the molarity is in the range 0.1M to 2M. The following is a calculation of the molarity of the sodium-containing compound of the general formula $NaMF_X$ (e.g. $NaBF_4$) in tetraglyme at the limits of the ranges of the first and second solvent components i) and ii) respectively:

0.1M $NaBF_4$ in carbonate:glyme (2:1) is equivalent to a molarity of 0.11M $NaBF_4$ in Tetraglyme.
0.1M $NaBF_4$ in carbonate:glyme (10:1) is equivalent to a molarity of 0.10M $NaBF_4$ in Tetraglyme.
5M $NaBF_4$ in carbonate:glyme (1:2) is equivalent to a molarity of 5.04M $NaBF_4$ in Tetraglyme.
5M $NaBF_4$ in carbonate:glyme (10:1) is equivalent to a molarity of 5M $NaBF_4$ in Tetraglyme.

The glycol diethers (also known as "glymes") used in solvent component ii) are saturated polyethers which contain no other functional groups and they can be made using glycol ether precursor materials. They are unlike glycols, such as polyethylene glycols (PEGs), because they do not carry free hydroxyl groups and thus are aprotic polar and chemically inert compounds. There are two major types of glycol diethers (glymes) depending on whether they are ethylene oxide (EO)-based glymes (the "e-series" and also known as PEG-based materials) or propylene oxide (PO)-based glymes (proglyme) (the "p-series" and also known as polypropylene glycol (PPG)-based).

Suitable examples of glymes include:
Ethylene glycol dimethyl ether (Monoglyme CH3-O—CH2 CH2—O—CH3)
Diethylene glycol dimethyl ether (Diglyme CH3-O—(CH2—O)2—CH3)
Triethylene glycol dimethyl ether (Triglyme, CH3-O—(CH2—O)3-CH3)
Tetraethylene glycol dimethyl ether (Tetraglyme, CH3-O—(CH2—O)4-CH3)
Ethylene glycol diethyl ether (Ethyl glyme, CH3CH2—O—CH2 CH2—O—CH2 CH3)
Diethylene glycol diethyl ether (Ethyl diglyme, CH3CH2—O—(CH2—O)2—CH2 CH3)
Diethylene glycol dibutyl ether (Butyl diglyme, CH3CH2 CH2—O—(CH2—O)2—CH2 CH3)
Poly(ethylene glycol) dimethyl ether (Polyglyme, CH3-O—(CH2—O)n-CH3)
Dipropylene glycol dimethyl ether (Proglyme, CH3-O—(CH2 CHCH3-0)2—CH3)

Most glycol diethers (glymes) benefit from being water-soluble, biodegradable and show low to moderate acute toxicity, and as a result are used in a broad range of industrial applications, for example in cleaning products, inks, adhesives and coatings, batteries and electronics, absorption refrigeration and heat pumps, and pharmaceutical formulations. Mixtures of methanol or trifluoroethanol and tetraglyme (PEG-DME 250) can be used as working fluids for absorption refrigeration machines, and triglyme and tetraglyme are lubricants for automotive air-conditioning (A/C) compressor units when mixed with refrigerants such as HFC-134a.

As defined above, the solvent component ii) may comprise one or more glycol ether acetates either in the presence or the absence of the one or more glycol diethers (glymes) which are defined above. Suitable glycol ether acetates include:
propylene glycol methyl ether acetate,
dipropylene glycol methyl ether acetate,
ethylene glycol monobutyl ether acetate,
ethylene glycol monomethyl ether acetate,
ethylene glycol monoethyl ether acetate,
diethylene glycol monobutyl ether acetate,
diethylene glycol monoethyl ether acetate, and
diethylene glycol monoethyl ether acetate.

The most preferred are ethylene glycol monomethyl ether acetate and ethylene glycol monoethyl ether acetate.

In the electrolyte compositions of the present invention, it is most preferable to use one or more e-series glymes, i.e. glycol diethers. The use of one or more selected from diethylene glycol dimethyl ether (diglyme), triethylene glycol dimethyl ether (triglyme) and tetraethylene glycol dimethyl ether (tetraglyme) is especially preferred.

The cyclic organo carbonate propylene carbonate ($CH_3C_2H_3O_2CO$) shows good compatibility with electrode materials, it has high solubility and has a high boiling point, these factors make it advantageous for use in batteries. The one or more further organo carbonate-based solvents used in the solvent component contain a carbonate ester group in their structure, i.e. a carbonyl group flanked by one or two alkoxygroups: $R_1O(C=O)OR_2$, and the $R_1$ and $R_2$ are independently selected (i.e. they may be the same or different from each other) from H and a $C_1$ to $C_{20}$-straight or cyclic, branched or unbranched, substituted or unsubstituted alkyl or alkenyl group. A $C_3$-$C_{10}$ cyclic further organo carbonate-based solvent, particularly ethylene carbonate, is a highly suitable further solvent. Polyalkylene carbonate materials such as diethyl carbonate, dimethyl carbonate and ethyl methyl carbonate are also highly useful.

Preferably, the solvent system of the electrolyte composition of the present invention does not contain any amount of an ionic liquid. If an ionic liquid is present in the electrolyte composition of the present invention then this will be in an amount which ensures that the ratio of first and second solvent components and the ratio of PC:glyme is maintained within the ratios described above.

In order to create a functional electrolyte, it is common practice to include additives in the electrolyte composition. An additive is needed to remedy the shortcomings of the original electrolyte recipe and it is a new chemical which is added in very small amounts. The need for a small amount originates from the preferred actions taking place at the electrolyte-electrode interfaces rather than in the bulk of the electrolyte. Degradation reactions often take place in the case of liquid electrolytes which result in insoluble products adhering to the negative electrode surface and forming a protective solid passivation layer, the solid electrolyte interphase (SEI). Typical interface/surface actions by an additive are to modify the SEI, increase the wetting of the surface and protect against overcharging events. Additives may also act as flame-retardants, fluidity enhancers/viscosity reducers, and as impurity or radical scavengers, etc. Particularly useful additives in the electrolyte compositions of the present invention include one or more selected from fluoroethylene carbonate (FEC) and vinylene carbonate (VC). Thus, the electrolyte compositions of the present invention comprise one or more further electrolyte additives in a small amount, for example <5 wt % of the total electrolyte composition.

The electrolyte compositions of the present invention are preferably employed in a sodium-ion cell. Consequently in a further embodiment, the present invention provides a sodium-ion cell comprising a negative electrode, a positive electrode and an electrolyte composition according to the present invention described above. Such sodium-ion cells may be used in an energy storage device, for example a battery, a rechargeable battery, an electrochemical device and an electrochromic device.

Ideally, the electrolyte compositions of the present invention are used in sodium-ion cells which utilise a carbon-based negative (anode) electrode.

Carbon, in the form of graphite, has been favoured for some time as an anode material in lithium-ion batteries due to its high gravimetric and volumetric capacity; graphite electrodes deliver reversible capacity of more than 360 mAh/g, comparable to the theoretical capacity of 372 mAh/g. The electrochemical reduction process involves $Li^+$ ions being inserted into the van der Waals gap between the graphene layers, to yield $LiC_6$. Although the electrolyte compositions of the present invention may be used with a graphite anode, graphite is in fact much less electrochemically active towards sodium and this, coupled with the fact that sodium has a significantly larger atomic radius compared with lithium, results in the intercalation between graphene layers in graphite anodes being severely restricted in sodium-ion cells.

The terms "graphite", "graphitic carbon", "natural graphite" and "synthetic graphite" refer to carbon materials which have the typical ordered and layered graphite structure of the graphite found in nature, they have two-dimensional long range order in both the "a" and the "c" crystallographic direction, orientation and indexing. Synthetic graphite is typically made by high temperature calcination of suitable carbon precursors and natural graphite is dug out of the ground and acid washed. Specifically, natural graphite and synthetic graphite are defined by the degree of crystallinity and interlayer spacing present; the a, b and c directions are crystallographically defined, with direction, orientation and indexing and the interlayer spacing of both natural graphite and synthetic graphite is defined as 3.35 Angstrom. Carbon materials which do not display both of these characteristics are not classified as "natural graphite" or "synthetic graphite" or "graphitic carbon".

By contrast, the sodium-ion cells of the present invention anodes use "modified graphitic" carbon materials which have a more disordered structure than graphite which enables some of the insertion issues experienced with sodium ions to be overcome.

Modified graphitic carbon materials include, but are not limited to non-graphitic carbon, isotropic carbon, partially graphitic carbon, exfoliated graphite, expanded graphite, amorphous carbon, soft carbon and hard carbon materials. For the avoidance of doubt, "modified graphitic carbon" as used herein does not include any carbon with a natural graphite structure or a synthesised graphite material with a structure identical to that of natural graphite material. The exact structure of modified graphitic carbon materials has still to be resolved, but most examples (apart from exfoliated and expanded graphite materials which are discussed below) are characterised by having two-dimensional long range order in the "a" crystallographic direction, but unlike natural or synthetic graphite, they lack "c" crystallographic direction, orientation and indexing. Meanwhile, all examples of modified graphitic carbon (apart from soft graphite) are non-graphitizable (i.e. unable to be converted into a well ordered layered structure similar to that of natural graphite). However, all examples without exception have layers, although these are not neatly stacked, and they all have micropores (micro-sized pores) formed between the disorderly stacked carbon layers. Further, at the macroscopic level, all forms of modified graphitic carbon are isotropic. One of the reasons why it is difficult to construct a universal structural model of modified graphitic carbon materials is that detailed structures, domain size, fraction of carbon layers and micropores depend on the synthesis conditions, such as carbon sources and carbonization temperatures. Typical methods of producing modified graphitic carbon employ starting materials such as sucrose, glucose, petroleum coke or pitch coke, which are mixed with a thermoplastic binder such as coal tar, petroleum based pitch or a synthetic resin, and then heated up to about 1200° C. A "hard carbon material" has layers, but these are not neatly stacked, and it has micropores (micro-sized pores) formed between the disorderly stacked carbon layers. At the macroscopic level, hard carbon is isotropic. Typically, hard carbon that is suitable for anode use may be produced from carbon-containing starting materials, such as sucrose, corn starch, glucose, organic polymers (e.g. polyacrylonitrile or resorcinol-formaldehyde gel), cellulose, petroleum coke or pitch coke, first mixed with a thermoplastic binder such as coal tar, petroleum based pitch or a synthetic resin, and then heated to about 1200° C. Commercially available hard carbons include those sold under the trade mark Carbotron™ hard carbon material (Kureha Corporation), or the Bio-Carbotron™ hard carbon material (Kuraray Chemical Company and Kureha Corporation).

Ideally, the sodium-ion cells of the present invention uses carbon materials alone as the anode, or in combination or as a composite with one or more other materials such as a Na-storable metal or alloy as detailed above, or a metal or a non-metal in its elemental or compound form. Particularly preferred anode active materials include hard carbon/X composite materials where X is one or more selected from: phosphorus, sulfur, indium, antimony, tin, lead, iron, manganese, molybdenum and germanium, either in elemental form or in compound form, preferably with one or more selected from oxygen, carbon, nitrogen, phosphorus, sulfur, silicon, fluorine, chlorine, bromine and iodine. X is preferably one or more selected from P, S, Sn, SnO, $SnO_2$, Sb, $Sb_2O_3$, SnSb and SbO.

The modified graphitic carbon materials termed as "expanded" or "exfoliated" graphite, have a structure which is recognizable as being similar to the structure of natural graphite but not identical to it because it is modified so that its carbons exhibit an interlayer spacing in the (001) direction which is greater than 3.35 Angstrom.

It is most preferable that the non-aqueous electrolyte compositions of the present invention are used with a modified graphitic carbon-containing anode, preferably a hard carbon anode.

In a highly preferred embodiment, therefore, the present invention provides a non-aqueous electrolyte composition described above which is suitable for use in a sodium-ion cell which contains an anode comprising modified graphitic carbon material, preferably a hard carbon anode.

Secondary carbon-containing materials may also be used in combination with the above mentioned anode active materials, interalia, to improve the conductivity of the anode, for example: activated carbon materials, particulate carbon black materials, graphene, carbon nano-tubes and graphite. Example particulate carbon black materials include: "C65™ carbon (also known as Super P™ carbon black) (BET nitrogen surface area 62 $m^2/g$) (available from Timcal Limited) although other carbon blacks are also available with a BET nitrogen surface area of <900 $m^2/g$, for example "Ensaco 350g™' which is a carbon black with a BET nitrogen surface area of 770 $m^2/g$ (available from Imerys Graphite and Carbon Limited as specialty carbons for rubber compositions). Carbon nano-tubes have a BET nitrogen surface area of 100-1000 $m^2/g$, graphene around 2630 $m^2/g$ and activated carbon materials have a BET nitrogen surface area of >3000 $m^2/g$.

Further the present invention provides a sodium-ion cell comprising a negative electrode, a positive electrode and a non-aqueous electrolyte composition according to the present invention as described above, wherein the negative electrode comprises modified graphitic carbon material, preferably a hard carbon material. Such sodium-ion cells may be used in an energy storage device, for example a battery, a rechargeable battery, an electrochemical device and an electrochromic device.

The sodium-ion secondary cells according to the present invention may comprise any positive electrode active material. Preferably, the cathode active material will have the general formula:

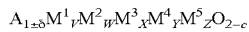

wherein
A is one or more alkali metals selected from sodium, potassium and lithium;
$M^1$ comprises one or more redox active metals in oxidation state +2, preferably selected from the group consisting of nickel, copper, cobalt and manganese;
$M^2$ comprises a metal in oxidation state greater than 0 to greater than or equal to +4;
$M^3$ comprises a metal in oxidation state +2;
$M^4$ comprises a metal in oxidation state greater than 0 to less than or equal to +4;
$M^5$ comprises a metal in oxidation state +3;
wherein
$0 \leq \delta \leq 1$;
V is >0;
W is $\geq 0$;
X is $\geq 0$;
Y is $\geq 0$;
at least one of W and Y is >0
Z is $\geq 0$;
C is in the range $0 \leq c < 2$
wherein V, W, X, Y, Z and C are chosen to maintain electrochemical neutrality.

Ideally, metal $M^2$ comprises one or more transition metals, and is preferably selected from manganese, titanium and zirconium; $M^3$ is preferably one or more selected from magnesium, calcium, copper, tin, zinc and cobalt; $M^4$ comprises one or more transition metals, preferably selected from manganese, titanium and zirconium; and $M^5$ is preferably one or more selected from aluminium, iron, cobalt, tin, molybdenum, chromium, vanadium, scandium and yttrium.

A particularly preferred cathode active material will be a nickelate-based material.

A cathode active material with any crystalline structure may be used, however, preferably the structure will be O3 or P2 or a derivative thereof, but, specifically, it is also possible that the cathode material will comprise a mixture of phases, i.e. it will have a non-uniform structure composed of several different crystalline forms.

BRIEF DESCRIPTION OF THE DRAWINGS

The present invention will now be described with reference to the following figures in which.

DETAILED DESCRIPTION

Figure 1:
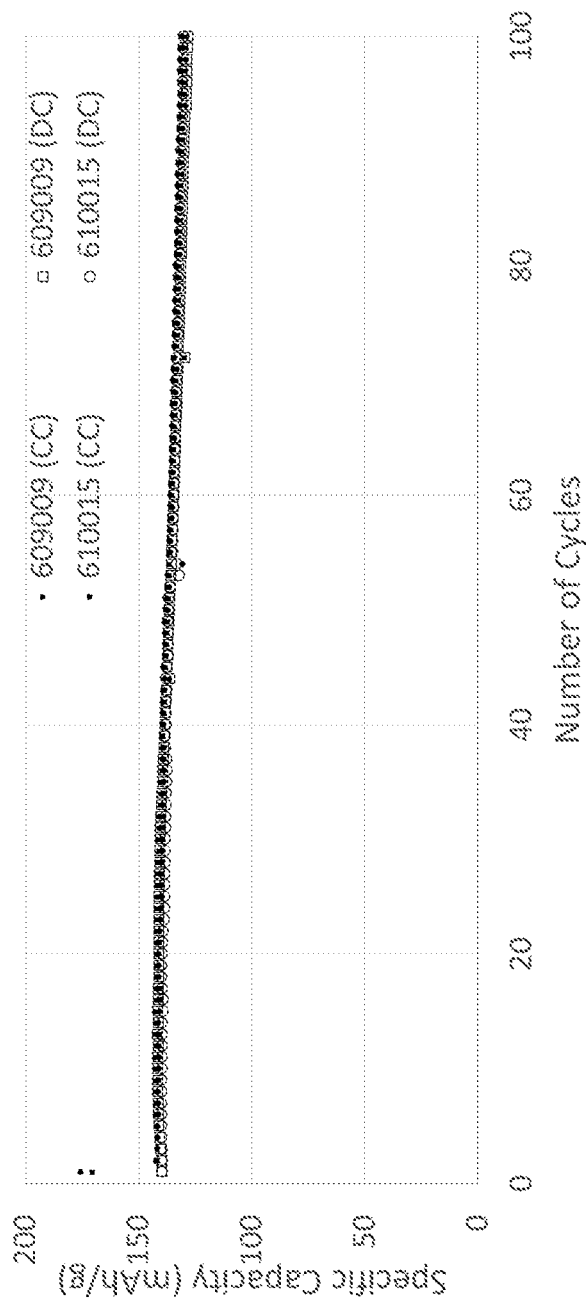
FIG. 1 shows a plot of cathode specific capacity (mAh/g) vs cycle number for cells with 0.5M NaPF6 in EC/DEC/PC 1/2/1 (cell #609009, CC (■) and DC (□)) and 0.5M NaPF6 in EC/DEC 1/1 (cell #610015, CC (●) and DC (○)); CC=charge capacity and DC=discharge capacity. The inset shows the first 40 cycles.

The electrolyte compositions under investigation were prepared using the following general procedure: Appropriate amounts of the solvents for the desired solvent system were weighed out in an argon-filled glove box and added to a brown glass bottle. The bottle was placed on a magnetic stirrer plate and the solvent mixture was stirred for approximately 2 hours at room temperature, to achieve a visually homogenously dispersed mixture. The correct amount of sodium salt (NaPF$_6$ and/or NaBF$_4$) was then weighed out in the argon-filled glovebox and slowly added to the solvent mixture under continued stirring. The electrolyte mixture was stirred until the salt was visually determined to have dissolved. The electrolyte mixture was then removed from the stirrer plate and stored and used in the argon-filled glovebox.

The precise composition of each of the comparative electrolyte compositions investigated, is detailed in Table 1 below:

TABLE 1

| Sodium Salt | Solvents | Solvent Ratio | Molarity | Voltage Test (V) | Test Temp. (° C.) | Cell #s |
|---|---|---|---|---|---|---|
| NaPF$_6$ | EC/DEC/PC (baseline) | 1/2/1 | 0.5 | 1.0-4.3 | 30 | 60909 |
| NaPF$_6$ | EC/DEC | 1/1 | 0.5 | 1.0-4.3 | 30 | 610015 |
| NaBF$_4$/NaPF$_6$ | EC/DEC/PC | 1/2/1 | 0.2/0.3 | 1.0-4.3 | 30 | 612020 |
| NaBF$_4$ | Tetraglyme (4glyme) | 1 | 0.5 | 1.0-4.3 | 30 | 702025 |
| NaBF$_4$ | EC/DEC/4glyme | 1/1/1 | 0.5 | 1.0-4.3 | 30 | 702026 |
| NaBF$_4$ | EC/DEC/4glyme | 1/1/1 | 0.5 | 1.0-4.2 | 30 | 703021 |
| NaBF$_4$ | EC/DEC/4glyme | 1/2/1 | 0.5 | 1.0-4.2 | 30 | 705038 |
| NaBF$_4$ | EC/DEC/4glyme | 1/1/1 | 0.75 | 1.0-4.2 | 30 | 705039 |
| NaBF$_4$ | EC/DEC/4glyme | 1/1/1 | 0.75 | 1.0-4.3 | 30 | 709012 |
| NaBF4 | EC/DEC/3glyme | 1/1/1 | 0.5 | 1.0-4.3 | 30 | 708020 |

As used herein, PC is propylene carbonate, CH$_3$C$_2$H$_3$O$_2$CO. This carbonate ester material is a solvent which is often used in Na-ion electrolytes due to it having good compatibility with electrode materials, high solubility and a high boiling point which makes it a 'safe option' choice in batteries. EC is ethylene carbonate, C$_2$H$_4$O$_2$CO.

Cell#s 702026, 703021, 705038, 705039, 709012 and 708020 are made using electrolyte compositions according to the present invention. In these electrolyte compositions, the solvent system contains a first solvent component i) which comprises a glycol diether which is either 3glyme or 4glyme and a second solvent component ii) which contains a mixture of organic alkyl carbonates, EC/DEC. Cell#s 60909, 610015, 612020 and 702025 are made using comparative electrolyte compositions.

Cell Construction

Generic Procedure to Make a Hard Carbon Na-ion Cell

Sodium ion pouch cells were built using active material electrodes, separator and electrolyte; aluminium tabs were connected to each of the electrodes and the cell was encased in a polymer-coated aluminium pouch.

The positive (cathode) electrode is prepared by solvent-casting a slurry of the active material, conductive carbon, binder and solvent. The conductive carbon used is C65 (Imerys). PVdF co-polymer (e.g. W#7500 from Kureha Chemicals) is used as the binder, and NMP is employed as the solvent. The slurry is then cast onto carbon-coated aluminium foil and dried at about 80° C. The electrode film contains the following components, expressed in percent by weight: 89% active material, 5% C65 carbon, and 6% W#7500 binder.

The hard carbon negative (anode) electrode is prepared by solvent-casting a slurry of the hard carbon active material (Kuranode Type 1, supplied by Kureha), conductive carbon, binder and solvent. The conductive carbon used is C65 (Imerys). PVdF co-polymer (e.g. VV#9300, Kureha Chemicals) is used as the binder, and NMP is employed as the solvent. The slurry is then cast onto carbon-coated aluminium foil and dried at about 80° C. The electrode film contains the following components, expressed in percent by weight: 88% active material, 3% C65 carbon, and 9% W#9300 binder.

Cell Testing

The cells are tested as follows using Constant Current Cycling techniques.

The cell is cycled at a given current density between pre-set voltage limits. A commercial battery cycler from Maccor Inc. (Tulsa, OK, USA) is used). On charge, alkali ions are inserted into the anode material. During discharge, alkali ions are extracted from the anode and re-inserted into the cathode active material.

Experiment 1: Determination of the Baseline Behaviour of NaPF$_6$ in EC/DEC/PC (Cell #609009) and Comparing the Results with Those Obtained for NaPF$_6$ in EC/DEC Carbonate Mixture (Cell #610015)

Test cells #609009 and 610015 were prepared using the above procedure and tested using constant current techniques as described above. The electrolyte composition used in cell #60909 contains a mixture of ethylene carbonate, diethyl carbonate and propylene carbonate (1:2:1) and cell #610015 does not contain any propylene carbonate.

A summary of the percentage first cycle loss, discharge capacity, mean discharge voltage and percentage capacity fade for cells #60909 and 610015 are detailed below in Table 2.

TABLE 2

| Electrolyte | Cell # | First cycle loss (FCL), (%) | Discharge capacity, D1 (mAh/g) | Mean discharge voltage, V1 (V) | Capacity fade (D1-D100)/D1, (%) |
|---|---|---|---|---|---|
| 0.5M NaPF$_6$ in EC/DEC/PC 1/2/1 (Comparative) | 60909 | 18 | 140 | 3.1 | 8 |
| 0.5M NaPF$_6$ in EC/DEC 1/1 (Comparative) | 610015 | 20.5 | 140 | 3.1 | 7 |

The data in Table 2 is representative of typical Na-ion cell behaviour, with discharge capacities and mean discharge voltage typical for this type of cell. The good agreement in capacity and voltage displayed between the cells of NaPF$_6$ electrolyte with different carbonate components, demonstrates that under these test conditions at 30° C., Na-ion cells utilising NaPF$_6$ in carbonate-based mixtures show similar cell capacity, first cycle loss and cycle life.

Experiment 2: Determining the Effect of Adding NaBF$_4$ to the Standard Carbonate-Containing Electrolyte Composition (Cell #612020) Compared Against the Effect of Having NaBF$_4$ in an Electrolyte Composition Comprising Only Tetraglyme and No Carbonates, (Cell #702025)

Figure 2:
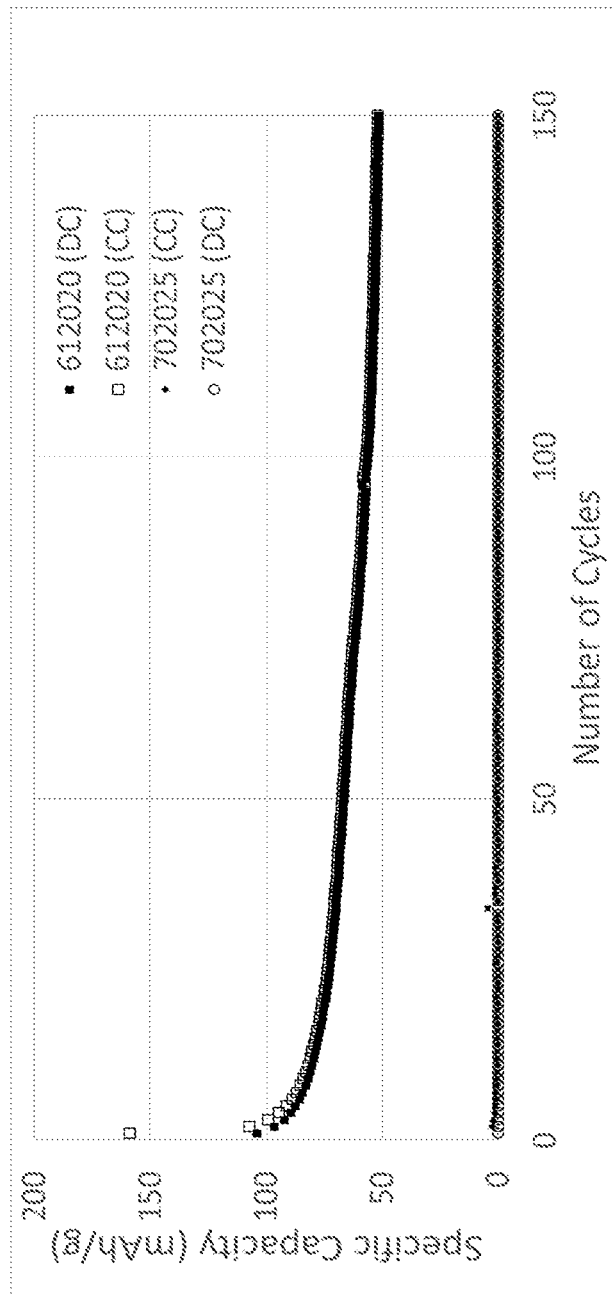
FIG. 2 shows a plot of cathode specific capacity (mAh/g) vs cycle number for cells with 0.2M/0.3M $NaBF_4/NaPF_6$ in EC/DEC/PC 1/2/1 (cell #612020, CC (□) and DC (■)) and 0.5M $NaBF_4$ in Tetraglyme (cell #702025, CC (●) and DC (○)); CC=charge capacity and DC=discharge capacity.

Test cells #612020 and 702025 were prepared and tested as described above. FIG. 2 shows a plot of the cathode specific capacity versus cycle number for cells #612020 and 702025. It is noted that cell #612020 made by the addition of NaBF$_4$ to the baseline electrolyte composition (as described above) leads to a reduction in cell capacity, an increase in first cycle loss and an increased percentage capacity fade as compared against the results obtained for a cell made using the baseline electrolyte composition (cell #60909). Further, it is observed that a cell made with an electrolyte composition comprising NaBF$_4$ in tetraglyme alone (cell #702025) does not behave as an ionically conductive electrolyte.

A summary of the percentage first cycle loss, discharge capacity, mean discharge voltage and percentage capacity fade for cells #612020 and 702025 are detailed below in Table 3.

NaPF$_6$-carbonate electrolyte. Therefore adding NaBF$_4$ to a carbonate electrolyte mixture does not bestow any advantages for cell performance. For (2), visual inspection confirms that NaBF$_4$ is soluble in a tetraglyme solution. Comparing cell #702025 with cells #60909 and #610015, an electrolyte of NaBF$_4$ in tetraglyme is not suitable for use in Na-ion cells which use a hard carbon anode; the cell first cycle loss is very high and no useable capacity was observed in the cell after the first cycle.

Experiment 3: Determining the Effect of Substituting Polycarbonate (PC) for Tetraglyme and Making a Full Substitution of NaPF$_6$ for NaBF$_4$ Test cells #702026, 703021, and were made using the electrolyte compositions comprising 0.5M NaBF$_4$ in EC/DEC/tretraglyme 1/1/1 as detailed in Table 1 above. Test cells #705039 and 709012 were prepared using electrolyte compositions comprising 0.75M NaBF$_4$ in EC/DEC/tetraglyme 1/1/1, to test the effect of increasing the molarity of NaBF$_4$.

Figure 3:
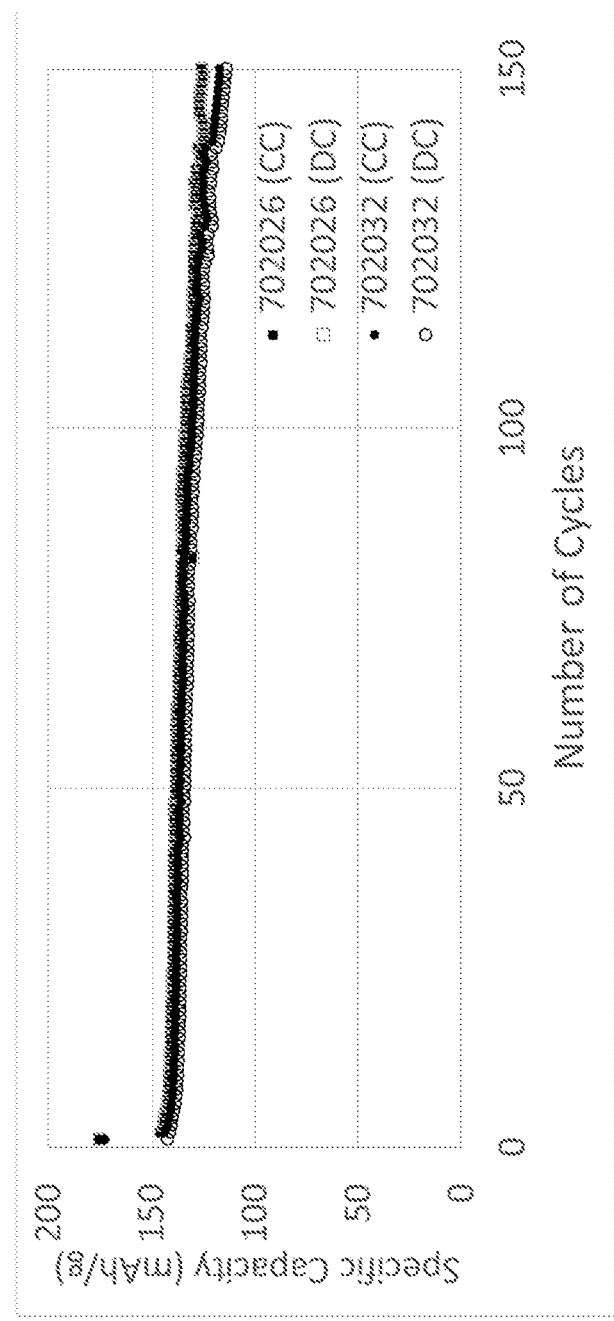
FIG. 3 shows a plot of cathode specific capacity (mAh/g) vs cycle number for cells with 0.5M $NaBF_4$ in EC/DEC/tretraglyme 1/1/1, cycled between 1.0 to 4.3V, (cell #702026, CC (■) and DC (□); cell #702032, CC (●) and DC (○); CC=charge capacity and DC=discharge capacity.
Figure 4:
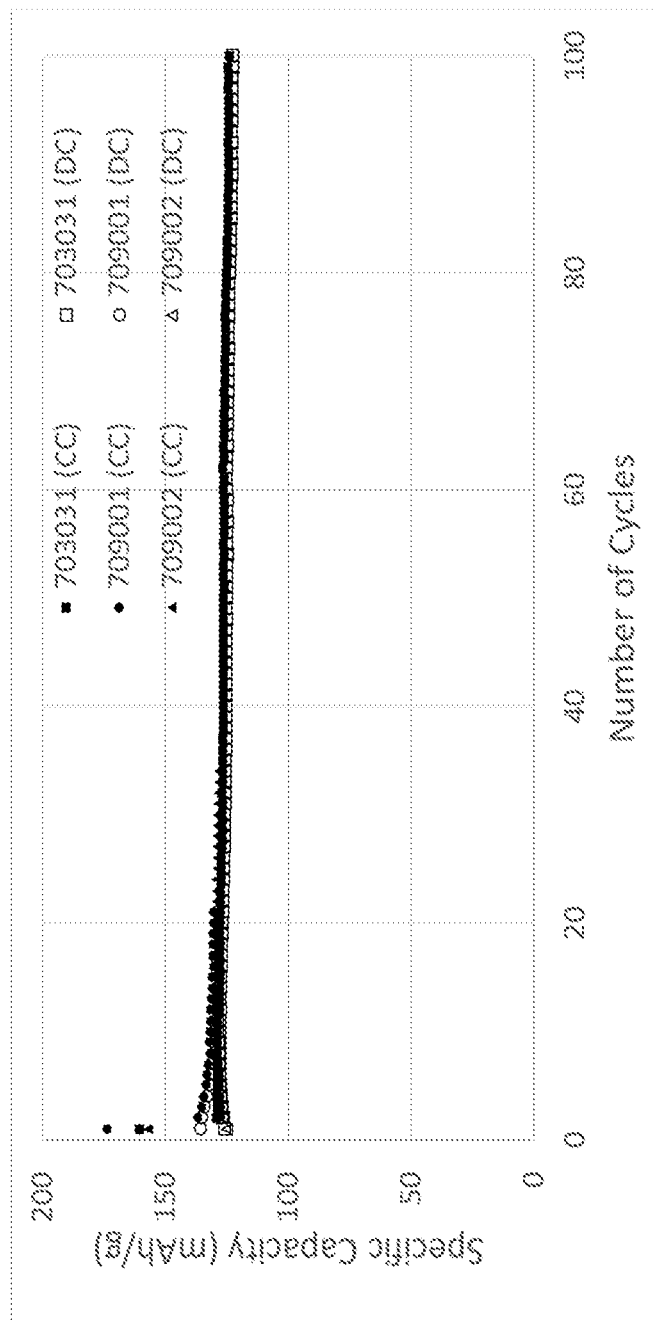
FIG. 4 shows a plot of cathode specific capacity (mAh/g) vs cycle number for cells with 0.5M $NaBF_4$ in EC/DEC/tretraglyme 1/1/1, cycled between 1.0 to 4.2V, (cell #703021, CC (■) and DC (□); cell #709001, CC (●) and DC (○); cell #709002, CC (▲) and DC (Δ); CC=charge capacity and DC=discharge capacity.

Cells #702026 and #709012 were then tested by cycling under a voltage limit of 1.0 to 4.3 V and cells #703021 and #705039 were tested by cycling under a voltage limit of 1.0 to 4.2V in order to investigate whether the oxidative stability of glymes is less than that of carbonate solvents. FIG. 3 shows a plot of cathode specific capacity versus cycle number for the cells cycled between 1.0 to 4.3V. FIG. 4 shows a plot of cathode specific capacity versus cycle number and a plot of the cell mean voltage versus cycle number, respectively, for the cells cycled between 1.0 and 4.2V.

TABLE 3

| Electrolyte | Cell # | First cycle loss (FCL), (%) | Discharge capacity, D1 (mAh/g) | Mean discharge voltage, V1 (V) | Capacity fade (D1-D100)/D1 (%) |
|---|---|---|---|---|---|
| 0.2M/0.3M NaBF$_4$/NaPF$_6$ in EC/DEC/PC 1/2/1 (Comparative) | 612020 | 34.6 | 104 | 3.1 | 55 |
| 0.5M NaBF$_4$ in Tetraglyme (Comparative) | 702025 | 99.9 | 0.002 | 1.1 | 100 |

The data in Table 3, shows the effect on Na-ion cell behaviour of (1) adding NaBF$_4$ to an electrolyte of NaPF$_6$ in carbonate solvents, and (2) using a NaBF$_4$ in tetraglyme electrolyte. For (1), the addition of NaBF$_4$ to a NaPF$_6$-carbonate electrolyte (compare cell #612020 with cells #60909 and #610015) leads to (i) an increase in the cell first cycle loss (ii) a decrease in the cell discharge capacity and an increase in the rate of cell capacity fade. It is apparent from visual inspection that the NaBF$_4$ is not soluble in this A shown in FIGS. 3 and 4, the shape of the capacity curve over the first ~10 cycles depends on the voltage range; a downwards exponent-shape curve is observed on cells cycling 1.0 to 4.3V (FIG. 3), however the shape is mirrored (i.e. increasing exponent-shape) on cycling 1.0 to 4.2 V (FIG. 4). This indicates there is a difference in the electrolyte stability with upper voltage limit, which could suggest that the solid electrolyte interphase (SEI) formation differs depending on the upper voltage.

The fade rate is much improved at lower voltage, although as expected, the overall cell capacity is reduced.

Figure 5:
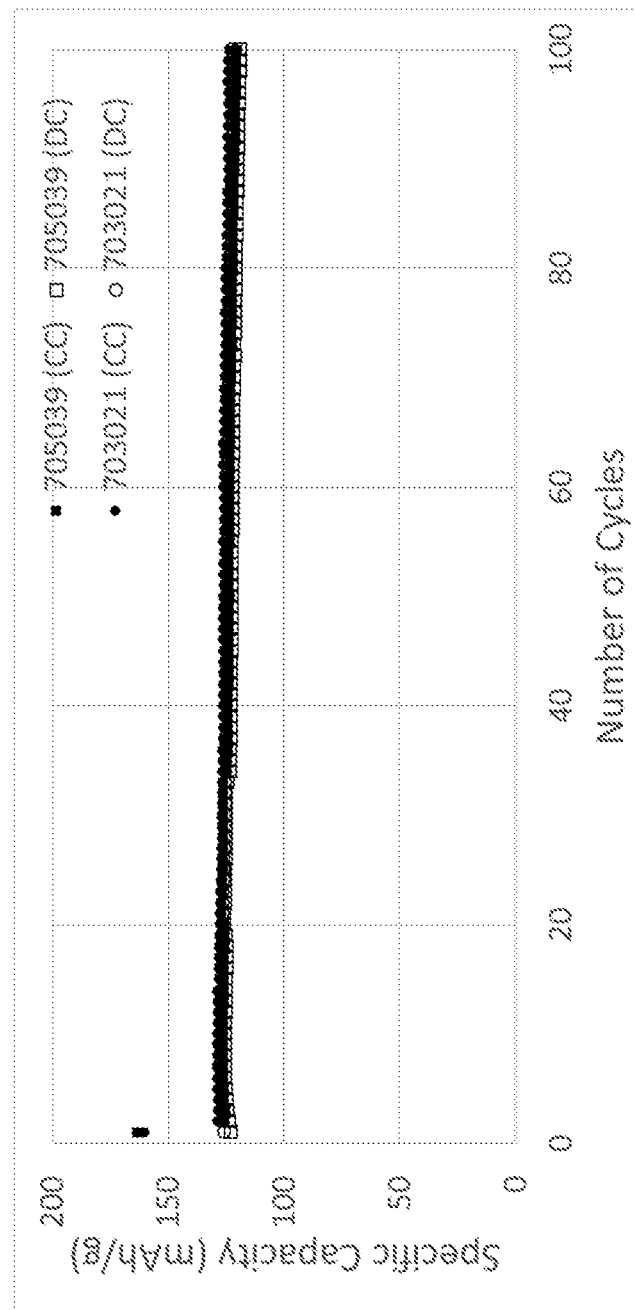
FIG. 5 shows a plot of cathode specific capacity (mAh/g) vs cycle number for cells with 0.75M $NaBF_4$ in EC/DEC/tetraglyme 1/1/1 (cell #705039, CC (■) and DC (□)) and 0.5M NaBF4 in EC/DEC/tetraglyme 1/1/1 (cell #703021, CC (●) and DC (○)); CC=charge capacity and DC=discharge capacity.

FIG. 5 somewhat surprisingly shows there is in fact no observable enhancement in the cell electrochemical performance when the amount of $NaBF_4$ is increased from a 0.5M electrolyte mixture (i.e. the molar amount $NaBF_4$ in the solvent system b)) to a 0.75M electrolyte mixture.

A summary of the percentage first cycle loss, discharge capacity, mean discharge voltage and percentage capacity fade for cells #702026, 709012, 703021, 705039 and are detailed below in Table 4.

Figure 6:
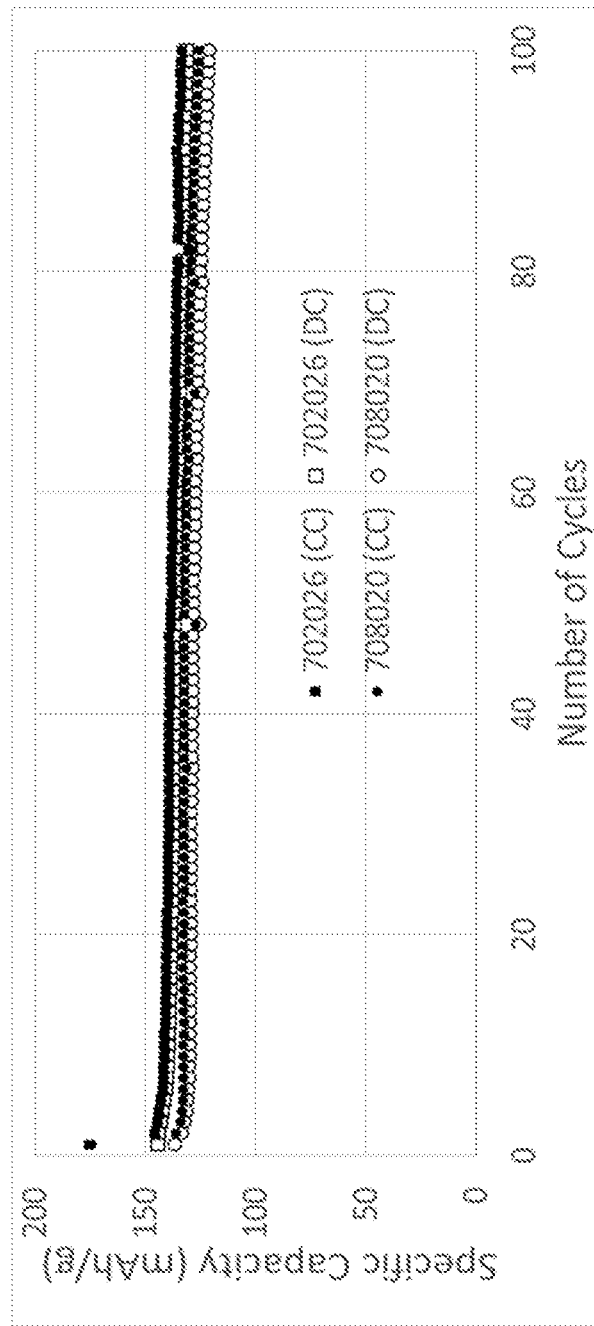
FIG. 6 shows a plot of cathode specific capacity (mAh/g) vs cycle number for cells with 0.5M NaBF$_4$ in EC/DEC/tetraglyme 1/1/1 (cell #702026, CC (■) and DC (□)) and 0.5M NaBF4 in EC/DEC/triglyme 1/1/1 (cell #708020, CC (●) and DC (○)); CC=charge capacity and DC=discharge capacity.

Test cells #702026 and 708020 were prepared and tested as described above. FIG. 6 shows a plot of the cathode specific capacity versus cycle number for the two cells. It is noted that cell #702026 was made using an electrolyte composition comprising 0.5M $NaBF_4$ in ethylene carbonate/diethylene carbonate and tetraglyme (4G) 1:1:1 and cell #708020 which was made using an electrolyte composition comprising 0.5M $NaBF_4$ in ethylene carbonate/diethylene carbonate and triglyme (3G) 1:1:1, show slight differences in cell capacity and discharge voltage, however both cycle with

TABLE 4

| Electrolyte | Voltage range (V) | Cell # | First cycle loss (FCL), % | Discharge capacity, D1 (mAh/g) | Mean discharge voltage, V1 (V) | Capacity fade at 100 cycles (D1-D100)/D1 % |
|---|---|---|---|---|---|---|
| 0.5M $NaBF_4$ in EC/DEC/tetraglyme 1/1/1 (Comparative) | 1.0-4.3 | 702026 | 17.1 | 145 | 3.15 | 9.7% |
|  | 1.0-4.2 | 703021 | 21.3 | 126 | 3.10 | 2.4% |
| 0.75M $NaBF_4$ in EC/DEC/tetraglyme 1/1/1 (Comparative) | 1.0-4.3 | 709012 | 20.9 | 136 | 3.15 | 6% at 20 cycles (D1-20)/D1 (%) |
|  | 1.0-4.2 | 705039 | 25.0 | 123 | 3.10 | 3.6% |

The data in Table 4, shows that (1) for $NaBF_4$/tetraglyme electrolyte to be utilised effectively in a Na-ion full cell with hard carbon anode, the addition of carbonate solvents (EC and DEC, in this example) is required. Also (2) it can be seen that this is demonstrated for different molarities of the electrolyte. In addition (3), it shows that lowering the upper cut-off voltage leads to a decrease in cell capacity and decrease in cell fade rate, as seen in electrolytes of $NaPF_6$ in carbonate solvent mixtures.

For (1), comparing cell #702025 (Table 3) with cell #702026, it is apparent that without the carbonate solvents in the electrolyte mixture, $NaBF_4$ in tetraglyme (cell #702025) is not an effective electrolyte for Na-ion cells with hard carbon anodes. However the addition of carbonate solvents (cell #702026) demonstrates a similar cell discharge capacity, mean discharge voltage and fade rate as cell 609009 with 0.5M $NaPF_6$ in EC/DEC/PC 1/2/1 electrolyte.

For (2), comparing cells #702026 with 709012 and cells #703021 with 705039, it is shown that it is possible to increase the molarity from 0.5 M to 0.75 M NaBF4 in EC/DEC/4G 1/1/1, without any detrimental effect on discharge capacities, mean discharge voltages and fade rates.

For (3), comparing cell #702026 with cell #703021, it is clear that the upper cut-off voltage leads to a reduction in cell capacity, mean discharge voltage and fade rate.

Experiment 4: An Investigation to Determine the Effect of Substituting Tetraglyme with Triglyme similar fade rates. This demonstrates the use of alternative glymes is possible when in combination with carbonate solvents and $NaBF_4$ salt.

Experiment 5: An Investigation to Determine the Effect of Using an Electrolyte Composition of the Present Invention Containing Propylene Carbonate, One or More Further Organo Carbonate-Based Solvents and Tetraglyme (4G)

Figure 7:
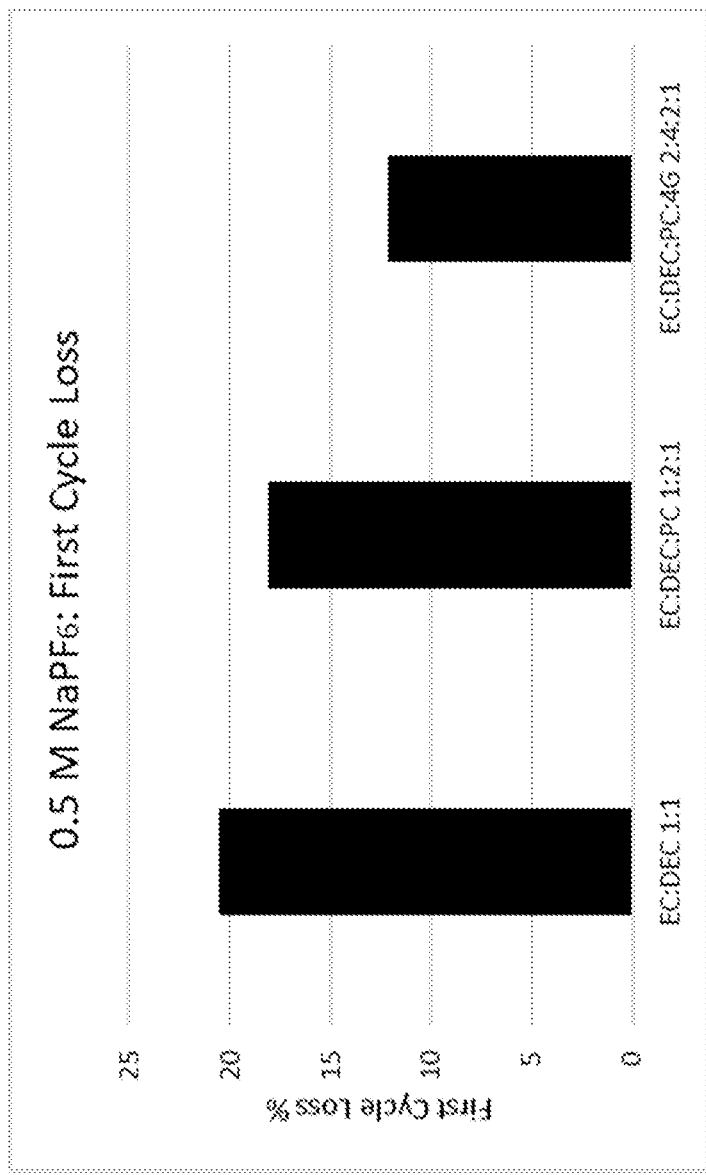
FIG. 7 shows the first cycle loss of sodium-ion cells using different electrolyte solvent formulations and NaPF6 salt.
Figure 8:
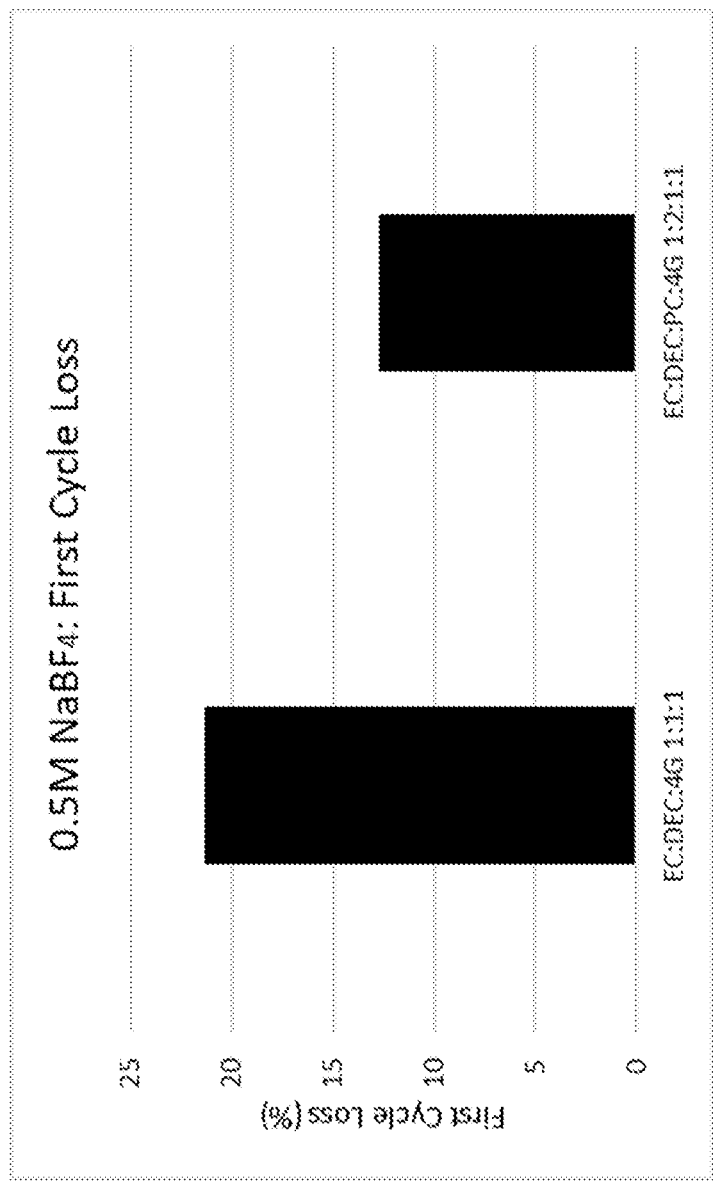
FIG. 8 shows the first cycle loss of sodium-ion cells using different electrolyte solvent formulations and NaBF$_4$ salt.

Solid-electrolyte-interface (SEI) formation is inextricably linked to the first cycle loss (FCL) of a cell, and FCL is the degree of irreversible capacity lost on the first charge/discharge cycle. As the results in Table 6 below and FIGS. 7 and 8 show, first cycle loss (FCL) is significantly reduced in Na-ion cells which utilise an electrolyte that contains propylene carbonate, at least one other organic carbonate and a glyme. For example, 0.5M $NaPF_6$ in EC/DEC/PC/4G 2:4:2:1 produces a reduced first cycle loss (FCL) of just 12% compared against the 20.5% produced by 0.5M $NaPF_6$ in EC/DEC 1:1 and the 18% produced by 0.5M $NaPF_6$ in EC/DEC/PC 1/2/1. Similarly, the electrolyte composition of the present invention which contains 0.5M $NaBF_4$ 1:2:1:1 (EC:DEC:PC:4G) produces a reduced FCL of 12.7%, whereas the comparative electrolyte 0.5 M $NaBF_4$ 1:1:1 (EC:DEC:4G) produces a FCL of 21.3%. This is a surprising

TABLE 5

| Electrolyte | Cell # | First cycle loss (FCL), (%) | Discharge capacity, D1 (mAh/g) | Mean discharge voltage, V1 (V) | Capacity fade (D1-D100)/D1 (%) |
|---|---|---|---|---|---|
| 0.5M $NaBF_4$ in EC/DEC/tetraglyme 1/1/1 (Comparative) | 702026 | 17.1 | 145 | 3.15 | 9.7 |
| 0.5M $NaBF_4$ in EC/DEC/triglyme 1/1/1 (Comparative) | 708020 | 21.7 | 137 | 3.08 | 11.7 | result; the presence of tetraglyme would not be expected to be an influencing factor on the formation of the solid-electrolyte-interface (SEI), particularly in view of known prior art results which demonstrate that a Na-ion system composed of a $Na_3V_2(PO_4)_2F_3$-containing cathode, a hard carbon anode and an electrolyte comprising 1 M $NaPF_6$ in 100% diglyme shows an exceptionally high first cycle irreversible loss of 30%.

TABLE 6

| Formulation | Cell # | First Cycle Loss % |
|---|---|---|
| 0.5M $NaPF_6$ in EC/DEC 1:1 (Comparative) | 610015 | 20.5 |
| 0.5M $NaPF_6$ in EC/DEC/PC 1/2/1 (Comparative) | 60909 | 18 |
| 0.5M $NaPF_6$ 2:4:2:1 (EC:DEC:PC:4G) (According to the present invention) | FPC180133_POST | 12.1 |
| 0.5M $NaBF_4$ 1:1:1 (EC:DEC:4G) (Comparative) | 703021 | 21.3 |
| 0.5M $NaBF_4$ 1:2:1:1 (EC:DEC:PC:4G) (According to the present invention) | AFPC69_POST | 12.7 |

CONCLUSIONS

The electrolyte composition of the present invention utilises a sodium-containing compound of the general formula $NaMF_X$, dissolved in a solvent system which comprises propylene carbonate, one or more organo carbonate-based solvents and one or more glycol diethers and/or one or more glycol ether acetates. As demonstrated by the results presented above, poor electrochemistry results are observed when the solvent components are used independently of one another, or in combinations which do not include all of these three components. It is the combination of PC and 4G that bestows the advantage of reduced first cycle loss to the electrochemical cell. The fact that the electrolyte composition of the present invention yields much improved first cycle loss and retains a good specific capacity level, as compared against analogous results using different combinations of the same ingredients, is highly surprising.

The invention claimed is:

1. A non-aqueous electrolyte composition comprising:
   a) one or more sodium-containing salts of the general formula $NaMF_X$, where M is selected from the group consisting of aluminum ($Al^{3+}$), boron ($B^{3+}$), gallium ($Ga^{3+}$), indium ($In^{3+}$), scandium ($Sc^{3+}$), Yttrium ($Y^{3+}$), lanthanum ($La^{3+}$), phosphorus ($P^{5+}$), and arsenic ($As^{5+}$), and x=4 or 6; and
   b) a solvent system which comprises:
      i) a first solvent component which comprises propylene carbonate (PC) and one or more further solvents selected from the group consisting of diethyl carbonate (DEC), dimethyl carbonate (DMC), ethylene carbonate (EC), and ethyl methyl carbonate (EMC); and
      ii) a second solvent component which comprises one or more ethylene oxide-based glymes selected from the group consisting of diethylene glycol dimethyl ether (diglyme), triethylene glycol dimethyl ether (triglyme), and tetraethylene glycol dimethyl ether (tetraglyme);
   wherein the molar ratio of propylene carbonate: second solvent component is in the range 1:0.2 to 1:2.

2. The non-aqueous electrolyte composition according to claim 1, wherein M is selected from the group consisting of boron ($B^{3+}$) and phosphorus ($P^{5+}$).

3. The non-aqueous electrolyte composition according to claim 1, wherein the first solvent component i) comprises propylene carbonate (PC) and ethylene carbonate (EC).

4. The non-aqueous electrolyte composition according to claim 3, wherein the first solvent component i) further comprises diethyl carbonate (DEC).

5. The non-aqueous electrolyte composition according to claim 1, wherein the non-aqueous electrolyte composition is selected from the group consisting of:
   0.5M $NaPF_6$ in a solvent mixture containing ethylene carbonate (EC), diethylcarbonate (DEC), propylene carbonate (PC), and ethylene oxide-based glymes, in the ratio 2:4:2:1; and
   0.5M $NaBF_4$ in a solvent mixture containing ethylene carbonate (EC), diethylcarbonate (DEC), propylene carbonate (PC), and ethylene oxide-based glymes, in the ratio 1:2:1:1.

6. A sodium-ion cell comprising a negative electrode, a positive electrode, and the non-aqueous electrolyte composition according to claim 1.

7. The sodium-ion cell according to claim 6, wherein the negative electrode comprises hard carbon.

8. An energy storage device comprising a negative electrode, a positive electrode, and the non-aqueous electrolyte composition according to claim 1.

9. The energy storage device according to claim 8, wherein the energy storage device is selected from the group consisting of a battery, a rechargeable battery, an electrochemical device, and an electrochromic device.

10. The non-aqueous electrolyte composition according to claim 1, wherein the molar ratio of propylene carbonate: second solvent component is in the range 1:0.2 to 1:1.5.

* * * * *